No. 634,745. Patented Oct. 10, 1899.
J. CHRISTIANSEN & F. E. THOMPSON.
AUTOMATIC WEIGHING MACHINE.
(Application filed Aug. 6, 1897.)
(No Model.) 5 Sheets—Sheet 1.

Witnesses:
H. Mallner
C. W. Lorenz

Inventors:
John Christiansen
Frank E. Thompson
By their Attorney
W. H. Honiss.

No. 634,745. Patented Oct. 10, 1899.
J. CHRISTIANSEN & F. E. THOMPSON.
AUTOMATIC WEIGHING MACHINE.
(Application filed Aug. 6, 1897.)

(No Model.) 5 Sheets—Sheet 3.

Witnesses:
H. Mallner
C. W. Lorenz

Inventors:
John Christiansen
Frank E. Thompson
By their Attorney
W. H. Honiss

No. 634,745. Patented Oct. 10, 1899.
J. CHRISTIANSEN & F. E. THOMPSON.
AUTOMATIC WEIGHING MACHINE.
(Application filed Aug. 6, 1897.)
(No Model.) 5 Sheets—Sheet 4.

Witnesses:
H. Mallner
C. W. Lorenz

Inventors:
John Christiansen
Frank E. Thompson
By their Attorney
W. H. Honiss.

THE NORRIS PETERS CO., PHOTO-LITHO, WASHINGTON, D. C.

No. 634,745. Patented Oct. 10, 1899.
J. CHRISTIANSEN & F. E. THOMPSON.
AUTOMATIC WEIGHING MACHINE.
(Application filed Aug. 6, 1897.)

(No Model.) 5 Sheets—Sheet 5.

Witnesses:
H. Mallun
C. W. Lorenz

Inventors:
John Cristiansen
Frank E. Thompson
By their Attorney
W. H. Honiss

UNITED STATES PATENT OFFICE.

JOHN CHRISTIANSEN AND FRANK E. THOMPSON, OF HARTFORD, CONNECTICUT.

AUTOMATIC WEIGHING-MACHINE.

SPECIFICATION forming part of Letters Patent No. 634,745, dated October 10, 1899.

Application filed August 6, 1897. Serial No. 647,311. (No model.)

*To all whom it may concern:*

Be it known that we, JOHN CHRISTIANSEN and FRANK E. THOMPSON, citizens of the United States, residing at Hartford, in the county of Hartford and State of Connecticut, have invented certain new and useful Improvements in Automatic Weighing-Machines, of which the following is a full, clear, and exact specification.

This invention relates to weighing-machines or meters for automatically weighing liquids, our object being primarily to provide a machine of improved organization that shall be simple in construction, easy to adjust and regulate, uniformly accurate and reliable in its operation, and not easily deranged or deteriorated by use or wear.

The invention comprises an air-tight supply-hopper, means for regulating the flow of the liquid therefrom by controlling the admission of air to displace the liquid, a supply-valve adapted to permit the flow of a considerable stream while the bucket is being filled and for reducing that flow to a drip as the load in the bucket approaches its poising-point, novel and effective valve-actuating means adapted to eliminate or compensate for the effect upon the load-receiving operation of the impact of the falling stream, diminishing the flow of that stream by imposing a diminishing force which ceases when the drip-supply position is reached and is then augmented to complete the closing movement of the valve, means for temporarily arresting the closing movement of the valve at its drip-supply position and during the poising movement of the beam in such a way as to reduce to a minimum the vitiating effect of the pressure of the valve-actuating devices upon that poising movement, an oscillating bucket, and a discharge-hopper provided with means for automatically controlling the action of the supply-valve-actuating mechanism whereby the rapidity of its recurring operations may be regulated and whereby the supply-valve is retained in its closed position until the bucket has discharged its previous load and has returned to its load-receiving position.

In connection with the foregoing we also provide means comprising an auxiliary pressure-reducing reservoir for receiving the liquid to be weighed from a water-main or other source of supply delivered under pressure and for delivering it to our improved weighing-machine at atmospheric pressure, so as to enable the liquid to flow by gravity into the machine.

In the drawings accompanying and forming a part of this specification.

The framework 9, to which all the parts composing our improved machine are attached, comprises two uprights connected by a U-shaped base, between which are located the bucket C and the discharge-hopper 1. Upon the top of the frame 9 is supported the supply-hopper B, and from its sides extend the brackets 55 for the support of the supply-valve and its operating mechanism.

The poising or weighing mechanism proper comprises a beam 8, provided with a counterweight 7 and having the usual knife-edges 57 resting on bearings 52 and 53, located on the base of the machine. The beam is also provided with the knife-edges 56 for supporting the frame 10, the upper ends of which are provided with the steadying or guiding links 66, extending from pivotal supports upon the framework 9. The frame 10 supports the oscillating bucket C by means of the trunnions 58, fastened to the sides thereof. The bucket is so shaped, its trunnions or pivots are located in such a position, and by the aid of a counterweight 59 is so balanced that when empty it will assume the upright or load-receiving position shown in Fig. 1; but when loaded or filled with liquid the center of gravity tends to tip the bucket forward, and this tipping is prevented during the loading operation by means of the latch 20 and latch-plate 25, attached to the frame 10 and to the bucket, respectively.

At the top of the machine and secured to the frame 9 in a fixed position is located the supply-hopper B. This hopper, which may be cylindrical or of any other suitable shape, preferably tapers downwardly, terminating in a discharge-spout 16 of relatively small size. A small air pipe or duct 5, preferably provided with a cock or valve 6, is attached to and communicates at or near the top of the supply-valve hopper with the interior thereof, the lower open end of the duct extending to a level, or nearly so, with the end of the discharge-spout 16.

The tank or barrel A, containing the liquid to be weighed, is connected with the supply-hopper by a pipe 61, which is also preferably provided with a cock or valve 34 to open or close the communication at will. The tank should be air-tight, the only access of air being through the duct 5 and the connecting-pipe 61, and it should be placed at such a level with relation to the hopper B as to enable the liquid to flow thereto in sufficient volume to keep the supply-hopper practically filled with the liquid.

Immediately beneath the supply-hopper B is pivotally suspended the supply-valve 3, the bottom or liquid-holding space of which in its annular relation to its center of suspension is of uniform area in radial cross-section, so that the liquid contents of the valve may flow along that bottom as the valve is oscillated by its actuators without altering the position of the center of gravity of the liquid, thereby interfering in the least possible degree with the smooth action of the valve. So long as these conditions are satisfied the supply-valve may be of any desired form of outline, but we have herein shown it to be substantially in the form of a quadrant sector of a cylinder, believing this to be its simplest and most serviceable form.

The supply-valve contains in its front end one or more drip-slots 13, which should be of a width suitably proportioned to the consistency of the liquid being weighed, and beneath which is a small conducting-passage 11, terminating in a discharge-spout 12. The valve is mounted upon and may be integral with the trunnions 3$^a$ and 3$^b$ and is pivotally suspended between the projecting arms or brackets 55 upon the screw-pivots 15, tapped in those brackets.

As a means for actuating the valve toward its closed position it is provided with a novel and effective device adapted to meet certain conditions and perform certain functions, the significance and importance of which can best be understood by prefacing the description of the device itself by a brief statement of the aforesaid conditions to be met and of the purposes to be served, it being believed by us that these circumstances and conditions have not hitherto been fully understood or properly recognized.

In nearly all weighing-machines of modern design and construction it has been found necessary when the load in the bucket approaches completion to reduce the rapid flow of the material to a comparatively small stream, which has been termed a "drip" in contradistinction to the "full" supply stream. This has been done in order to secure steadiness of movement of the bucket and the scale-beam during its poising movement and also to insure greater accuracy in the weighing operation by reducing to a minimum the falling column of grain remaining in suspension in the air at the instant that the drip-supply is cut off by the exact poising of the bucket-load, the supply-valve being ordinarily so connected with the scale-beam that the latter when it approaches its poising position serves to close the valve, or rather permits it to be closed, from its full-supply to its drip-supply position. The importance of these features has been duly recognized hitherto; but we believe that the effect of variations in the impact of the falling material during the full-supply position of the valve has hitherto been but imperfectly understood and provided for. The effect of the impact of material falling into the bucket depends upon several factors—the specific gravity of the material, the size of the falling stream, and the height from which it falls—and it is found necessary to adjust the present known machines with reference to a given size of supply-stream, a readjustment at least of the valve-actuating devices being required if any alteration occurs or is purposely made in the size of that stream. This necessity arises from the circumstance that the greater force of impact of a large stream tends to move the beam toward its poising position, and consequently to allow the valve to close to its drip-supply position at a stage in its loading operation somewhat in advance of that at which the beam would be so moved by the impact force of a small stream. If, therefore, while one of those machines is adjusted for a large supply-stream the size of stream were to be reduced without altering the adjustment of the valve-actuating devices, the greatly-lessened force of the impact would allow the beam and the bucket to remain in their raised position until the bucket has received very nearly a full load in dead-weight of material; but a great difference will be seen in the downward movement of the beam and its load under the two differing conditions. In the first instance, employing the larger supply-stream, the downward pressure upon the beam and the bucket is greatly lessened by the reduction of the supply from a large stream to a small drip, and the effect of such a reduction is to allow the bucket-load to settle more steadily down toward the poising position until the accumulation of dead-weight by the drip-supply carries it to the exact poising-point. In the second instance, however, employing the smaller supply-stream, the effect of the dead-weight, which in such a case is the principal means of moving the beam and bucket downward from their full-supply position, does not diminish during that movement. On the contrary, it has a slightly-accelerative effect because of its momentum, which is liable to continue the downward movement to and past the poising-point of the beam before its load is actually completed. These conditions tending to cause this premature poising of the beam instead of being counteracted by the valve-actuating devices now in use are by most if not all of them actually aggravated or increased, inasmuch as they continue to exert without even substantial diminution the same pressure upon the valve and through it upon the beam as that exerted during the full-supply position of the machine.

From the foregoing brief description of the actual conditions and combinations of force under which the bucket of a weighing-machine receives its load it will be seen that the valve-actuating means should be of a nature adapted to begin the shutting off of the supply-stream before the combined effect of the impact of the stream and the dead-weight in the bucket becomes in itself sufficient to carry the beam to or toward the poising-point. It is also important in order to facilitate the rapid operation of the apparatus that the reduction of the supply-stream should not be commenced sooner or continued faster than is actually required to prevent the above-described premature poising action of the beam and that the closing of the supply-valve once begun should be continued with an effect gradually lessening at such a rate as to keep but slightly in advance of the combined effect of the increasing dead-weight and the decreasing impact of the stream, ceasing altogether when the valve reaches its drip-supply position to be renewed and if possible augmented after the poising position is reached in order to quickly and fully close the valve.

Figures 1, 8, 9, 10, 11:
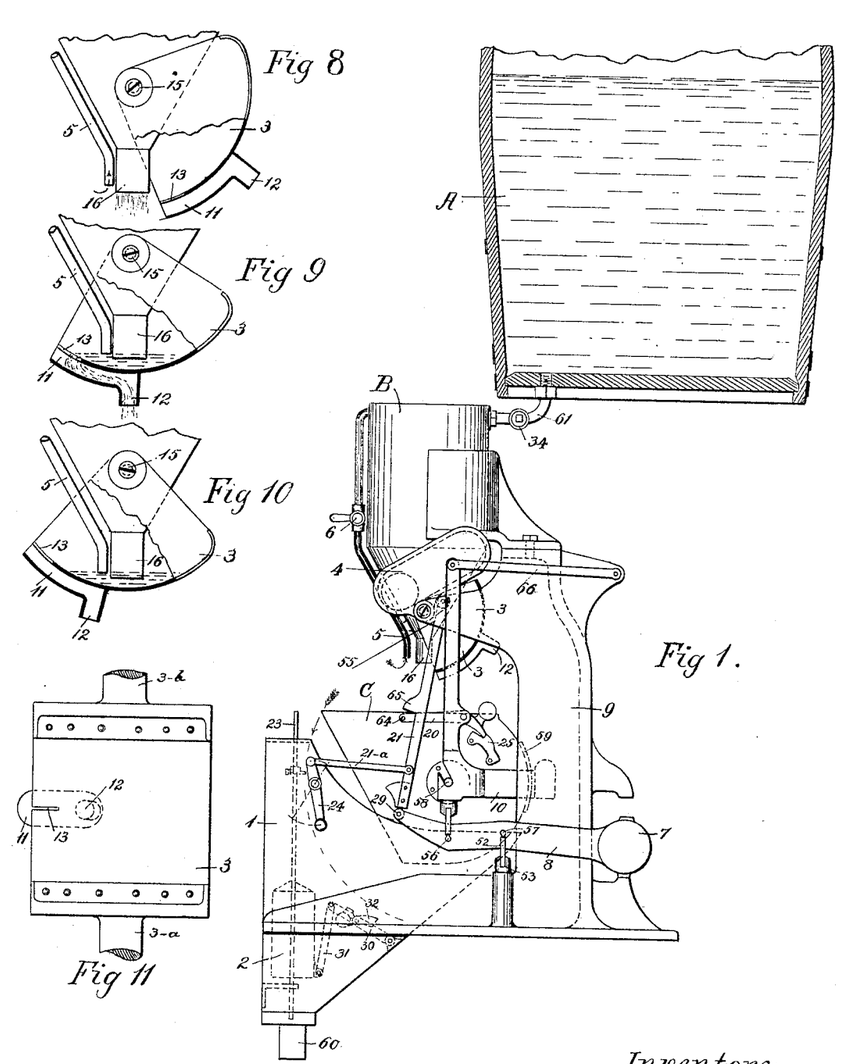
Figure 1 is a side elevation of our weighing-machine and represents that machine in its normal position when empty and not in operation, the weight of the scale-beam being down and the supply-valve wide open ready to admit to the bucket the liquid to be weighed.
Figs. 8, 9, and 10 are detail views of the supply-valve, showing the three positions thereof with relation to the spout and air-duct of the supply-hopper corresponding with the positions of the valve-actuating mechanism shown in Figs. 5, 6, and 7, respectively.
Fig. 11 is a plan view of the supply-valve projected from Fig. 10, showing the drip-orifice and the delivery-spout thereof.

In the application of our improved valve-actuating means we consider the valve-closing function as being separated into two parts, the first being that of closing it from the fully-opened position of Fig. 8 to the drip position of Fig. 9, the second function being exercised in completing the closing movement to the position shown in Fig. 10. In the preferred embodiment of our invention these divided functions are respectively performed by two distinct devices or subcombinations. The first of these, which is herein designated as the "auxiliary actuator," consists of the weight-arm 18, pivotally attached to the supply-valve structure at or near the center of oscillation of the latter and provided with the weight 19. The effect of the weight 19 may be varied to any desired degree by adjusting it in a radial relation to the axis of oscillation of the valve and by changing its angular position with relation to that valve. The radial adjustment is effected by moving it to any desired position upon the rod 18, fixing it therein by means of the set-screw 19ª, the angular adjustment being effected by means of the set-screw 67 abutting against any convenient fixed portion of the valve or the trunnions, it being represented in the drawings as engaging against the drip-lever 17.

Our preferred means for performing the function of closing the valve from the drip-supply position shown in Fig. 9 to that shown in Fig. 10 comprises a casing 4, containing a freely-gravitating weight, which is herein shown as a rolling cylinder 22. The casing 4 may be made integral with the trunnion 3ª and is preferably made to entirely inclose the weight, thereby preventing accretions of dust and dirt from interfering with the accuracy of its operation.

The means herein shown for opening the valve from its closed position (shown in Fig. 10) to its open or full-supply position (shown in Fig. 8) and for retaining it in the latter position when the bucket is receiving the greater portion of its load do not constitute a part of our present invention. It consists of the valve-rod 21, which is pivotally attached at its upper end to the crank-arm 14, the latter being herein shown to be fixed upon or integral with the trunnion 3ª, the lower end of the rod being held by the link 21ª in engaging relation to the roller 29 on the beam 8, the supply-valve being pushed to its open position by the movement of that beam from the position shown in Fig. 2 to that shown in Fig. 1. By reason of the nature of its connection with the supply-valve this device coöperates to a certain extent with our auxiliary valve-closing device by imposing a suitable resistance to the closing movement of the valve, thereby insuring greater steadiness of action, the valve-rod 21 being the connecting means whereby the position of the valve is maintained throughout its closing movement in suitable relation to that of the beam. The opposite end of the link 21ª is herein shown to be attached to one end of the hand-lever 24, pivoted upon the discharge-hopper 1. By moving this hand-lever to its dot-and-dash position (shown in Fig. 1) the valve-rod 21 may be thrown out of engaging relation to the roller 29 for stopping the machine or to enable the accuracy of its balance to be tested.

Figures 2, 5, 6, 7:
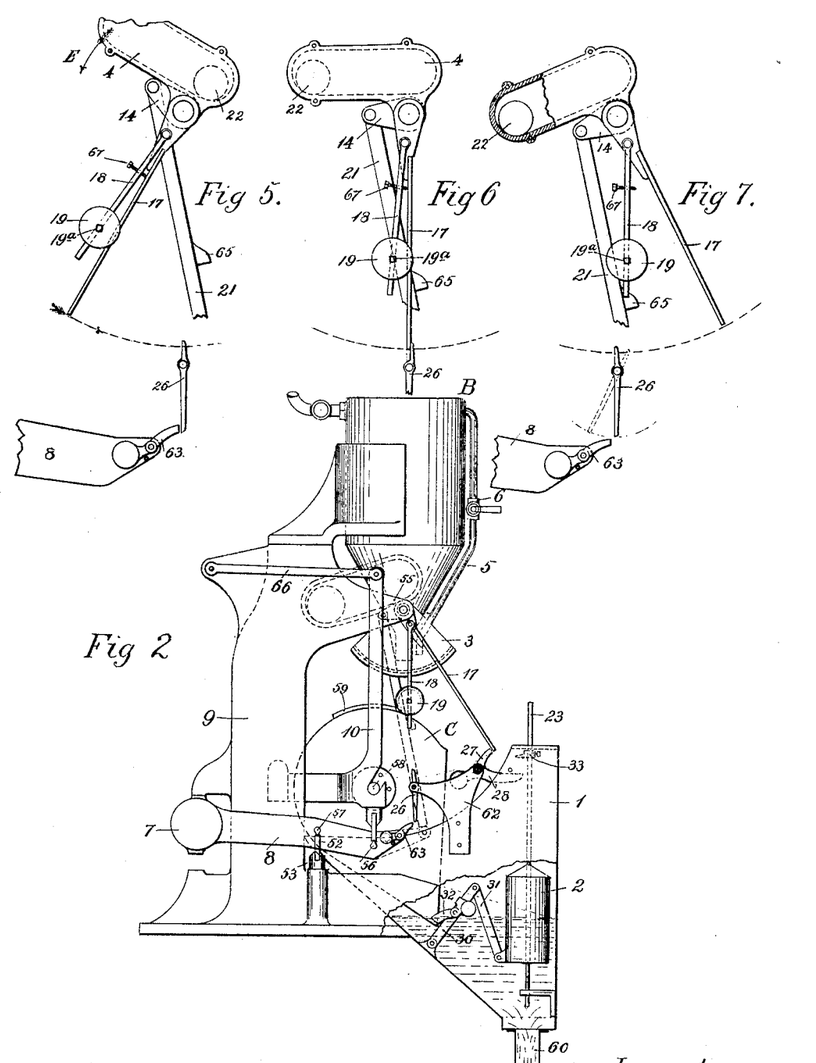
Fig. 2 is a side elevation of the machine, showing the opposite side to that shown in Fig. 1, representing it in the act of discharging a bucket-load of liquid into the discharge-hopper, the weight of the scale-beam being raised, the supply-valve closed, and the fluid passing out through the discharge-spout at the bottom of the discharge-hopper.
Figs. 5, 6, and 7 are detail views of the valve-actuating mechanism, representing it in the three different positions occupied by it during the full-supply, the drip-supply, and the cut-off or complete closing positions, respectively, of the valve.

Our improved means for temporarily arresting the closing movement of the supply-valve at its drip-supply position and for converting the direct downward pressure exerted by the supply-valve-opening devices upon the beam through the medium of the valve-rod 21 to a greatly-reduced pressure exerted upon the beam in a direction at right angles to its poising movement consists of a pressure-reducing latch-lever 26, which is pivotally mounted upon the bracket 62, as shown in Fig. 2, its upper and shorter end engaging with the end of the drip-lever 17, attached to or integral with the valve during the poising movement of the beam, and while the supply-valve is in its drip-supply position. (Shown in Fig. 9.) The lower and longer end of the latch-lever 26 is suspended in engaging relation to the counterweighted by-pass latch 63, pivotally mounted upon the beam 8 to allow the drip-lever to pass by it on the return movement.

The supply-valve is retained in its closed position (shown in Fig. 10) by means of the counterweighted by-pass latch 27, pivotally mounted upon the bracket 62 and engaging with the end of the drip-lever 17. In the arrangement shown in Fig. 2 the latch is moved so as to release the drip-lever by means of the dog 33 upon the valve-rod 23 impinging against the lever 28 as the float 2 is lowered to a predetermined level by the receding of the liquid in the discharge-hopper.

Figure 18:
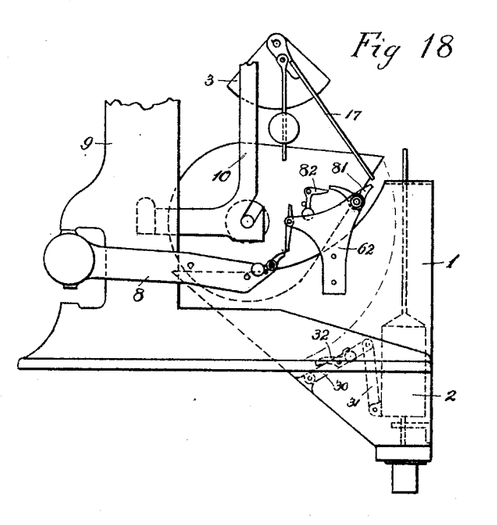
Fig. 18 is a left-hand side elevation of the lower portion of the machine, showing a modified arrangement, which for most purposes is preferred by us, whereby we are enabled to release the valve from its locked position (shown in Figs. 2 and 7) by the closing movement of the bucket.

Our preferred means for releasing the drip-lever is operated by the bucket on its closing movement after the latter is released by the float in the discharge-hopper and is shown in Fig. 18. It consists of the latch 81, which is pivotally mounted on the bracket 62, with one of its arms resting in the path of movement of the by-pass dog 82, pivotally mounted upon the side of the bucket in such a relation to the latch 81 as to disengage the latter from the drip-lever 17 just before the bucket reaches its vertical or load-receiving position, in which it is latched, as before, by means of its latch 20 on the opposite side of the bucket, as shown in Fig. 1.

Below the bucket and located so as to receive the load thereof is a discharge-hopper 1 containing a float 2, which is fixed to the sliding guide-rod 23. The float is connected by means of the link 31 to an arm 30, provided with a counterweighted latch 32, so that when the bucket empties its contents into the discharge-hopper, thereby raising the float 2, the latch 32 will engage with the edge of the bucket and hold it in its discharging position, as shown in Fig. 2, until the float shall have lowered with the level of the liquid in the discharge-hopper sufficiently to withdraw the latch from the bucket.

The weight 19 should be adjusted in its angular relation to the supply-valve so as to hang practically vertical, as shown in Fig. 6, when the supply-valve is at its drip position, exerting in this position practically no turning influence whatever upon the valve, and when the parts are in their full-supply position (shown in Fig. 5) the weight 19 should be adjusted upon its rod 18 radially toward or from the center of oscillation of the valve to an extent sufficient to cause it to exert a suitable closing force upon the supply-valve, thereby enabling it to inaugurate the closing movement of the valve when the load reaches the proper point.

A description will now be given of the operation of the machine, it being understood that a barrel of liquid has been tapped and connected with the supply-hopper, as indicated in Fig. 1. The supply-valve being held in its wide-open position (shown in Fig. 8) by means of the beam 8 and the valve-rod 21 the liquid will flow freely out through the spout 16 into the bucket C. As the bucket fills, it gradually descends, carrying with it the outer end of the beam 8, upon which the valve-rod 21 rests, thereby permitting the valve to turn on its axis in the direction of the arrow E of Fig. 5 until the parts reach the positions shown in Figs. 6 and 9. Up to this time the valve has been actuated by the gradually-diminishing effect of the weight 19, the level of the casing 4 of the rolling weight 22 having been such as to keep the latter at the forward end of that casing, as shown in Fig. 5; but upon reaching the position shown in Fig. 6, at which the weight 19 hangs nearly vertical, and thereby becomes and thereafter remains practically inoperative, the angular change in the level of the casing permits the weight 22 to gravitate to the opposite or rearward end of the casing, as shown in that figure. At the position shown in Fig. 6 the lower end of the drip-lever 17 comes in contact with the upper or shorter end of the latch-lever 26, the lower or longer end of which is engaged by the by-pass latch upon the end of the beam 8, thereby retaining the valve in the drip position, (shown in Fig. 9,) the impulse of the valve-actuators, which until then has been directly resisted or controlled by the beam through the medium of the valve-rod 21, being now transferred from that rod to the drip-lever 17 and converted from a direct downward pressure upon the beam to a greatly-reduced lateral pressure thereon, acting through the latch-lever 26 and the latch 63 at right angles to the poising movement, thus allowing the beam to respond with the utmost freedom to the action of the load resting upon its knife-edges. At this time the load is nearing its poising position and the supply-valve, being in the position shown in Fig. 9, has filled with liquid up to the level of the bottom of the spout 16 and of the air-duct 5, thus preventing the air from entering that duct, thereby stopping the rapid flow of the liquid into the bucket. The drip flow, however, continues through the slot 13 until the load of the bucket is completed, the liquid in the valve being maintained substantially at the level of the bottom of the spout 16 by the admission of air through the duct 5 whenever liquid is drawn below the level of that duct. At the completion of the load the beam is carried to its exact poising position, at which the by-pass latch 63 disengages from the latch-lever 26, thereby releasing the drip-lever 17, which, under the influence of the weight 22, is quickly and forcibly moved to the position shown in Fig. 7, carrying the valve with it to the closed position shown in Fig. 10, with its drip-opening 13 above the level of the liquid in the valve, which level, being still slightly above that of the bottom of the spout 16 and of the air-duct 5, seals the latter and prevents further flow from the hopper B. This closing movement of the valve also operates through its crank 14 to carry the valve-rod 21 downwardly with considerable force against the roller 29 of the beam, thereby swinging the latter below its poising position. During this downward movement the valve-rod 21 by means of its lug 65 has tripped the pawl 20 by striking the pin 64, fixed thereon. The bucket, being thus released, has tipped and emptied its load into the discharge-hopper, as shown in Fig. 2. The float 2 rises with the surface of the liquid, the drip-lever 17 is engaged by the latch 27, and the bucket is held in its open position by the latch 32. The devices are so adjusted that as the level of the liquid in the discharge-hopper 1 is lowered by its discharge through the spout 60 the bucket is first released from the latch 32 and allowed to return to its normal position, after which the dog 33, coming in contact with the lever 28, releases the drip-lever 17 from the latch 27. In our preferred construction (shown in Fig. 18) the drip-lever is released from the latch 81 by means of the dog 82, which trips the latch as the bucket swings to its load-receiving position. While the parts are in the discharging position, (shown in Fig. 2,) the beam-weight 7 is retained in its elevated position by means of the valve-rod 21; but as soon as the drip-lever 17 is released from its latch the beam 8 by virtue of the preponderance of its weight 7 becomes the valve-actuating means, serving to open the latter, with its attached members, from their positions shown in Figs. 7 and 10 to those shown in Figs. 5 and 8, from which point the loading and discharging operations are thus automatically repeated.

The object of locking the bucket when in its open or discharging position (shown in Fig. 2) is to give the liquid ample time to drain thoroughly from its walls, and this is particularly desirable in weighing liquids which flow slowly, such as oils, syrups, and similar substances. By supplying the spout 60 with an adjustable gate or with other means for regulating the rapidity of the discharge therefrom it may, in conjunction with the float 2, be made to serve as a means for accurately regulating the rapidity of the recurring operations of the machine.

The discharge-hopper is carried up behind the bucket in such a way that the liquid in discharging from the latter will flow behind the spout of the tipping bucket, and thus form a liquid cushion, thereby preventing the jars or blows usually incident to the action of swinging or oscillating buckets.

The function of the lever 26 is to reduce to a minimum the friction between the drip-lever and the beam. It is highly desirable, and even well nigh essential, in machines of this class that the means for shutting off the final drip of the bucket-load shall be intimately associated with the beam, so that its shutting-off movement may be accurately controlled by the poising movement of the latter while interfering in the least possible degree with the delicacy of that poising movement. When the drip-lever 17 comes against the latch-lever 26, the impulse of the valve-actuating means is converted thereby from a direct downward pressure to a sidewise pressure against the beam, besides being greatly reduced by reason of the much greater length of the drip-lever 17 as compared with that of the valve-rod crank 14. Therefore at the poising position of the beam the only object in contact with it which may vitiate the accuracy of its operation is the longer end of the lever 26, impinging against the latch 63 of the beam. If the drip-lever 17 were to directly engage with the latch on the beam, the friction of the latch in sliding against the drip-lever might be sufficient to cause irregularity and inaccuracy in weighing. For machines which must operate with extreme accuracy the points in sliding contact may be provided with jewels, thereby still further reducing the effect of friction.

Figures 3, 4, 12, 13:
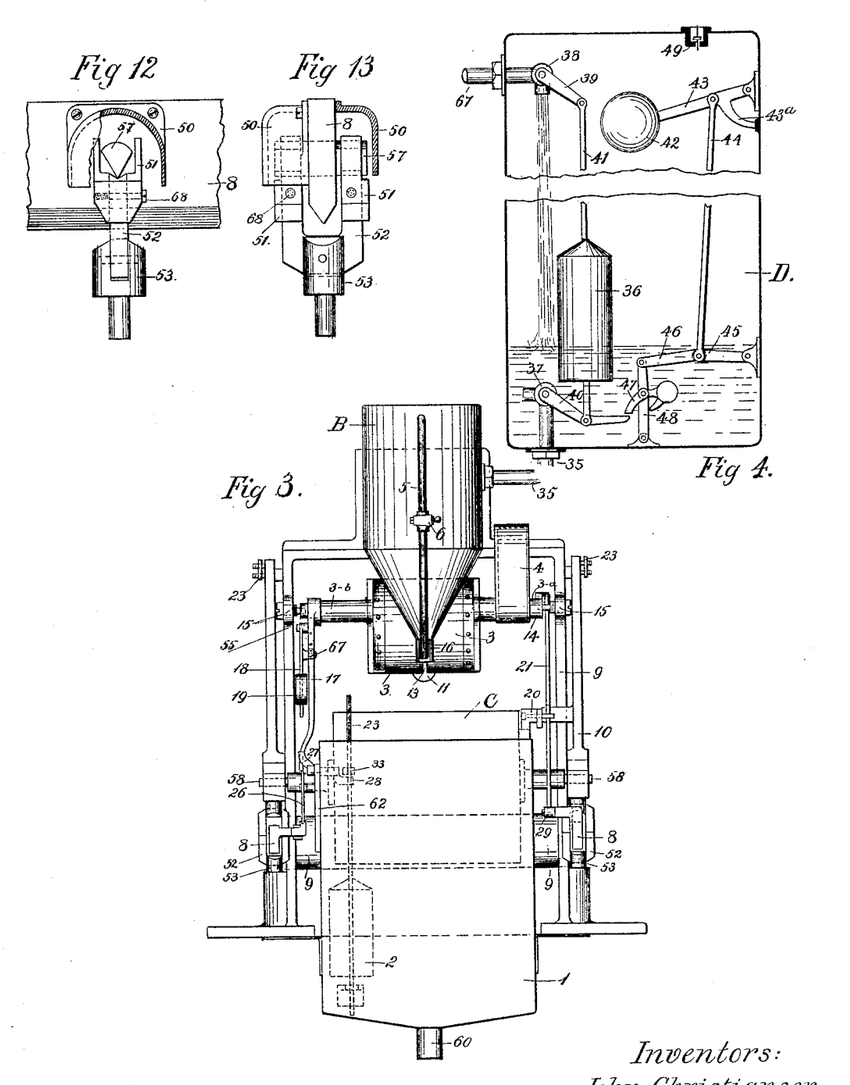
Fig. 3 is a front view of the weighing-machine, showing the parts thereof in the position which they occupy in Fig. 1.
Fig. 4 is a sectional elevation of a pressure-reducing reservoir which may be employed as an auxiliary to our machine when used to weigh liquids delivered under pressure.
Figs. 12 and 13 are an end and a side view, respectively, of our improved means for protecting the knife-edges from grit and dust and for preventing displacement thereof.

This machine as so far described will satisfactorily weigh the contents of an air-tight barrel or tank, but if the liquid to be weighed is taken from a water-main or from some other source under pressure it becomes necessary to interpose between said supply and the weighing-machine an auxiliary reservoir and pressure-reducing apparatus of the character shown in Fig. 4. This consists of an air-tight tank or reservoir D, having a connection 35 with the supply-hopper B and a connection 67 with the pressure-supply. These connections are provided with the cocks 37 and 38, respectively, located within the tank and having their operating handles or levers 39 and 40 connected by means of the rod 41. That rod has fixed upon it a float 36 of a weight sufficient to operate the handles in one direction, they being operated in the opposite or upward direction by the buoyancy of the float. The cocks are so arranged relative to their levers that when one of them is open the other is closed, and vice versa. Another float 42 is arranged near the top of the reservoir at the end of a lever 43, which is pivotally mounted upon the inner side wall of the reservoir and provided with a foot 43ª for sustaining it in the position shown in the figure. From this lever a rod 44 connects with the toggle-links 45 and 46 of the lever 48, the latter having mounted upon it a counterweighted latch 47 for engaging with the handle or lever 40 of the cock 37. At the top of the reservoir is located a check-valve 49, which will allow air to pass out of the tank, but will not allow it to enter. The operation of this auxiliary supply-reservoir and pressure-reducing apparatus is as follows: In the position shown in Fig. 4 the cock 38 is open to the continuous supply and the cock 37 is closed. Hence the weighing machine is temporarily out of action. The liquid flows into the reservoir and as its level rises the air displaced thereby passes out through the air-valve 49. The float 36, being locked down by the latch 47, cannot rise until the surface of the liquid reaches and buoys up the float 42, thereby releasing the float 36 from its latch. As the float 36 rises it reverses the condition of the cocks 37 and 38, closing the latter and opening the former. The liquid now flows into the supply-hopper of the weighing-machine and starts it into action, which is continued until the auxiliary reservoir is emptied sufficiently to allow the float 36 to again drop to the position shown in Fig. 4, when it repeats the filling operation just described.

It will be readily understood that when the auxiliary reservoir D is to be used as a permanent feature the supply-hopper B may be entirely dispensed with, substituting the reservoir therefor by leading the pipe 35 down to the supply-valve 3 and having it occupy the same relative position as the discharge-spout 16 of the supply-hopper and by connecting the air-duct 5 with the interior of the reservoir D, so as to obtain a smooth flow of liquid therefrom.

To prevent possible dislocation of the knife-edges and to guard them against dust and dirt, we preferably construct and arrange them as shown in Figs. 12 and 13. The knife-edge 57 is inserted in the beam 8 and rests on the steel-tempered support 52, while the cap 50, fixed to the beam, covers the knife-edge entirely and prevents anything from falling upon or lodging in the V-shaped bearing. The bracket 51, attached to the V-shaped bearing and extending upwardly on each side of the knife-edge, serves to absolutely prevent the dislocation thereof, which is of frequent occurrence when no such protection is provided.

The devices shown herein for controlling the efflux of liquid from the supply-hopper by the alternate interposition and removal of a liquid seal may be greatly varied to suit the various conditions under which they may be employed. For example, they may be employed in connection with a valve or receptacle having a rising-and-falling instead of an oscillatory movement, or it may be used in connection with a fixed or non-movable receptacle in place of the movable valve shown herein, the rise and fall of the liquid for the sealing and unsealing operations being caused by means of a float suspended in the receptacle and raised or lowered by the valve-actuating devices, so as to displace a greater or less amount of liquid according as the liquid is raised or lowered. Nor is it essential to the operation of the device that the external opening of the air-duct 5 be carried even substantially to the level of the opening of the discharge-spout, since it is clear that the liquid would readily flow from that spout even if submerged to any depth in the liquid below. In some organizations it may be desirable to locate the external opening of the air-duct at a considerable distance from the level of the discharge-spout, and in that case the liquid seal may be applied and removed from that external opening by the operation of a float resting upon the surface of the liquid in a receptacle corresponding to the supply-valve herein shown. (See Fig. 19.) We also consider it preferable, although not essential, to conduct the air to a level in the tank or supply-hopper above that of the liquid contained therein, inasmuch as a smoother flow is thereby obtained.

This weighing-machine may be employed as a water-meter for service-pipes if used in connection with means for reducing the pressure in the pipes to that of the atmosphere, as explained and described in connection with Fig. 4, the spout 60 of the discharge-hopper being connected with a suitable storage-reservoir for receiving the liquid after it is weighed. It may and preferably should also be provided with any of the several well-known registering devices for keeping account of the number of bucket-loads. In connection with such a use of the machine the controlling of the flow of liquid by means of a liquid seal is a feature of very great importance, inasmuch as the mechanical gates or valves usually employed in connection with water-meters are liable to soon become loose, and consequently to leak, requiring frequent and expensive repairs as a result of the wear incident to their frequent operation. Such a leakage in a machine of this class is very difficult to detect and may continue unnoticed for a long time, thereby greatly impairing the efficiency and reliability of the apparatus. The reliability and accuracy of our means for interposing a liquid seal to the flow of the liquid is not dependent upon maintaining the wearing-surfaces of valves in a liquid-tight condition, and hence its operation may be continued unimpaired for an indefinite period of time.

Figure 14:
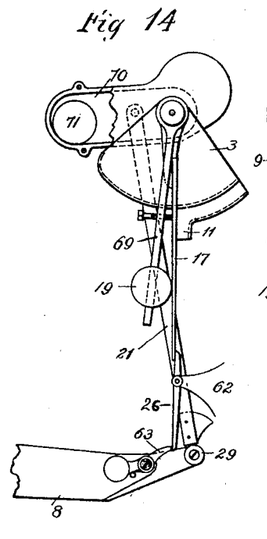
Figs. 14, 15, and 16 are respectively a left-hand side elevation, a front elevation, and a right-hand side elevation of a modified arrangement of our improved valve-actuating devices in which the weight support or casing is so located as to cause the gravitating weight to travel radially with relation to the axis of oscillation of the parts. In this modification the valve-rod 21 is shown to be attached directly upon the side of the casing and the auxiliary weight-lever is mounted upon one of the valve-trunnions, so as to oscillate concentrically with the axis thereof.
Figure 15:
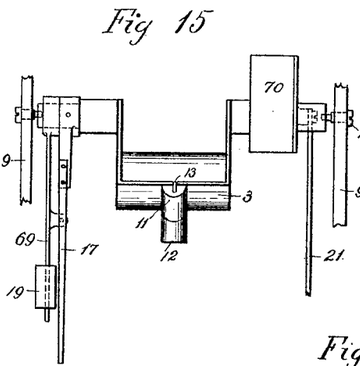
Figure 16:
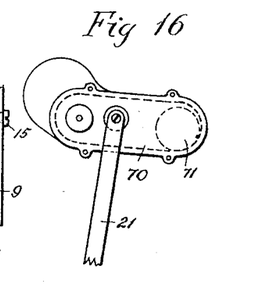

In the modification shown in Figs. 14, 15, and 16 the support 70 for the weight 71 is so located that the path of movement of that weight shall be exactly radial to the axis of oscillation of the trunnion and the valve, thereby enabling the weight when the valve is in its open position to rest with its center of gravity substantially coincident with the axis of the valve, thereby nullifying the effect of its weight upon the oscillatory movement of that valve. In this modification the lever 69 for the weight 19 is mounted to swing concentrically with the axis of the valve-trunnions.

Figure 17:
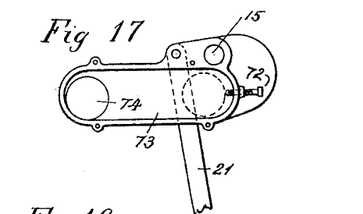
Fig. 17 is a left-hand side elevation of another modified arrangement of our improved valve-actuating device in which the support or casing for the gravitating weight is located below the axis of oscillation of the valve, thereby dispensing with the necessity for the auxiliary weight shown in the previous figures.

In Fig. 17 is shown a modified arrangement of our improved valve-actuating means, whereby we may dispense altogether with the auxiliary actuator shown in the preceding figures of the drawings. In this modification the casing 73 is arranged below the axis of the valve-trunnions and in such a relation thereto that the weight 74 while resting at the end of its movement nearest to that axis, as shown in dotted line, serves as a substitute for the counterweight 19, which forms the auxiliary actuator of the previous figures, its effective position with relation to the axis of the trunnion being made adjustable by means of the set-screw 72. Upon reaching the position shown in Fig. 17, corresponding to that shown in Fig. 6, the inclination of the casing allows the weight to travel to the end of the casing farthest from the axis, and it thenceforth performs its function exactly as shown in Figs. 6 and 7 and as previously described in connection therewith. Wherever its use is permissible, we prefer the arrangement shown in Figs. 14, 15, and 16, in which the resting or inoperative position of the weight and the pivotal suspension-point of the auxiliary actuator-arm 69 are concentric with the axis of oscillation of the valve itself, since we thereby in a large degree dispense with the necessity of counterbalancing the respective parts. It will be understood, however, that the form to be employed should be chosen with regard to the particular requirements and circumstances of each individual case.

Figure 19:
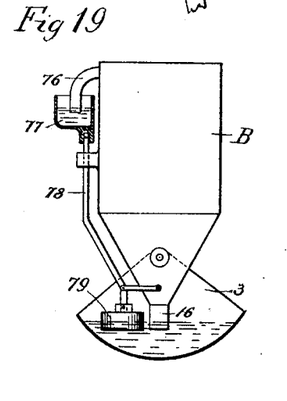
Fig. 19 is a side elevation showing a modified arrangement for interposing a liquid seal for controlling the flow of the liquid from the supply-hopper.

In Fig. 19 is shown a modified arrangement of means for interposing the liquid seal and for controlling the application of that seal by the level of the liquid in the valve-receptacle. In this modification the air-duct 76 is very much shorter than that of the preceding figures, and the supply-hopper B has mounted upon its side a cup 77, containing the liquid which is to be employed as a seal. The cup surrounds the lower end of the duct 76 and is connected by means of the rod 78 with the float 79, located adjacent to the discharge-spout 16, so as to be buoyed up by the liquid contained in the valve-receptacle, the changing level of which operates to alternately raise and lower the cup and apply and remove the seal. In the employment of this device the liquid in the cup which forms the seal need not necessarily be of the same kind as that which is being weighed, but may be of a kind best available or best adapted to this particular purpose.

The air-duct 5 (shown in the first figures of the drawings) may, if preferred, be located wholly or partially within the supply-tank, emerging therefrom at a suitable level with relation to that of the liquid in the supply-valve receptacle. Although this air-duct is not considered by us to be strictly indispensable to the working of the machine, which would operate with a considerable degree of satisfaction if that duct were to be omitted, yet that omission would produce an irregular gurgling movement of the liquid due to the opposing forces of the entering air and the discharging liquid. In the absence of an air-duct or its equivalent the amount of air that would be admitted at each exposure of the lower end of the spout 16 would, because of the size of that spout, be much greater than would be admitted by a corresponding exposure of the lower end of the air-duct, thereby discharging a greater quantity at each admission of the air. By the use of the air-duct, however, the liquid is enabled to flow smoothly and freely out of the supply-spout, and during the drip-supply period of the operation of the machine the level of the liquid in the supply-valve will be renewed by smaller and more frequent admission of the liquid from the supply-hopper.

Figure 20:
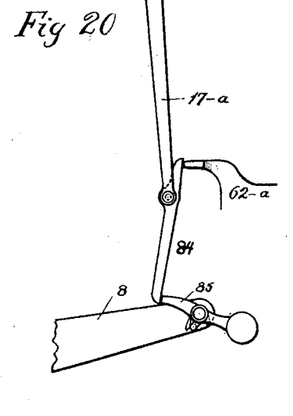
Fig. 20 is a side view of a modified position and engagement of our pressure-reducing latch-lever, showing it mounted upon the drip-lever instead of upon the bracket 62.

In the modification shown in Fig. 20 the latch-lever 84 is pivotally mounted upon the end of the drip-lever 17ª, the shorter end of the lever engaging with a suitably-shaped portion of the bracket 62ª, while the longer end of the lever engages with the by-pass latch 85, pivotally mounted upon the beam 8.

Figure 21:
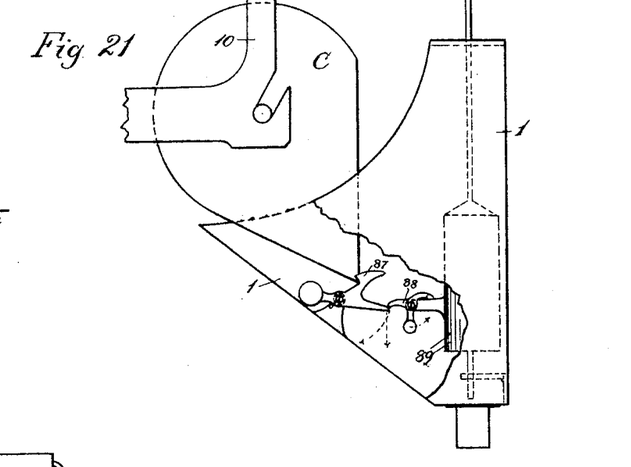
Fig. 21 is a side view showing a modified arrangement of our device for locking the bucket in its discharging position and for releasing it therefrom by the float of the discharge-hopper.

In the modification shown in Fig. 21 the latch 87, by means of which the bucket C is held in its open position, is pivotally mounted to suitably-projecting ears of the discharge-hopper 1 and is located in engaging relation to the dog 88 upon the float 89, instead of being connected with the float by means of links, as shown in the previous figures. This modification may be preferred for use in connection, for example, with the weighing of liquids which flow slowly and which might therefore fail to buoy up the float of Figs. 1 and 2 in time to enable its latch 32 to engage with the edge of the bucket when the latter reaches its fully-opened position, so that the bucket might sometimes rebound beyond the reach of the latch before the float permitted the latch to act. In the arrangement shown in Fig. 21, however, the float 89 after disengaging the latch 87 from the bucket passes by the latch, as indicated by the dotted lines representing their respective movements, with the continued lowering of the liquid and allows that latch to be returned by its counterweight to its bucket-engaging position. When the float is again raised by the discharge of the succeeding bucket-load, the dog 88, being pivotally attached to the float, is enabled to turn sufficiently to pass by its engaging end of the dog 87.

Figure 22:
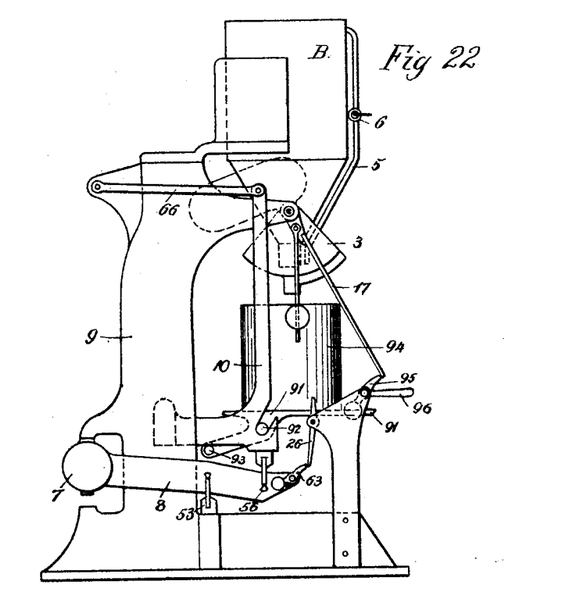
Fig. 22 is a side elevation showing a modified arrangement of our invention whereby a portion of the machine of the previous figures is adapted for use as a platform-scale operating automatically, as before, as to the control of the supply, but being provided with supplemental means to be operated by hand for releasing the supply-valve for the succeeding loads.

In the modification shown in Fig. 22 the bucket of the previous figures is removed and a platform 91 substituted in its place. For convenience in making the substitution this platform is provided with projections 92, corresponding to the trunnions 58 of the bucket, which rest in the trunnion-bearings in the bucket-frame 10, the platform, however, being prevented from turning by means of the projections 93, which extend rearwardly and engage with the sides of the frame 10. In this modification the discharge-hopper 1 is not employed and is preferably removed to enable the operator to stand close to the machine. This modified form of our machine is adapted to the filling of bags, bottles, cans, and similar packing-receptacles with a given weight of material. One of these receptacles 94 is shown in filling position upon the platform beneath the supply-valve. In the use of this adaptation of our invention the operation of the supply-valve and its actuators, the reducing of the supply-stream to a drip, and the closing and locking of the valve in the position shown in the figure are performed automatically in the manner hereinbefore described. Then the filled receptacle 94 is removed and an empty one substituted in its place, after which the operator releases the supply-valve by tripping the latch 95 by means of its handle 96, thus allowing the mechanism to repeat its filling and weighing operations.

That portion of our preferred form of valve-actuating means which serves to close the valve from the full-supply to the drip-supply position and which is herein designated as the "auxiliary actuator" may be dispensed with by the use of the arrangement shown in Fig. 17, the function of the auxiliary actuator of the previous figures being performed by the rolling weight 74 when properly arranged and adjusted; but, as hereinbefore stated, we prefer the arrangement shown in Figs. 5, 6, and 7, inasmuch as the several members thereof may independently and more readily be adjusted, each to serve its particular part in the function performed by the device.

The novel valve-actuating devices herein shown may be applied to machines for weighing other than liquid materials and may also be employed for operating valves unlike that shown herein. It will be obvious that the character and movements of these improved actuating devices are exactly suited for application to an oscillating valve without any conversion of its movement. Those devices may be mounted to oscillate upon bearings independent of and remote from the bearings of the supply-valve, being connected therewith by means of suitable connecting-rods. It will be equally obvious to one skilled in this art that the oscillatory movement of our valve-actuating devices may by the use of connecting-links in many well-known ways be converted, so as to impart the desired movement to valves which are arranged for other than oscillatory movement. In many similar ways within the province of the mechanic skilled in this art the various elements of the machine shown herein may be modified or equivalent elements substituted without essentially departing from or exceeding the clear intent and scope of this invention.

We claim as our invention—

1. In a weighing-machine for liquids, an air-tight supply-hopper therefor, provided with a duct or passage for admitting air to the interior of the hopper, with means operable by the poising movement of the weighed liquid for interposing a liquid seal to prevent ingress of air through the duct.

2. In a weighing-machine, an air-tight supply-hopper therefor, provided with a duct or passage for admitting air to the interior of the hopper, a supply-valve for receiving the liquid from the hopper, and means operable by the poising movement of the machine, for changing the level of the liquid in the supply-valve and interposing a liquid seal to prevent the admission of air through the duct or passage.

3. In a weighing-machine, an air-tight supply-hopper therefor provided with a duct or passage for admitting air to the interior of the hopper, a supply-valve for receiving the liquid from the hopper, means for interposing a liquid seal to prevent the admission of air through the duct or passage, and means operable by the discharging movement of the machine for removing the said liquid seal so as to admit air through the duct or passage to the supply-hopper.

4. In a weighing-machine for liquids, a supply-hopper of air-tight construction, having a discharge-spout located below the surface of the liquid, and provided with an air duct or passage communicating with the interior upper portion of the hopper, the ingress portion of the duct being substantially upon a level with the end of the discharge-spout, with means operable by the poising movement of the machine for retaining the liquid discharged therefrom so as to form a liquid seal, and thereby prevent admission of air through the duct.

5. An air-tight supply-tank for liquids, having a discharge-spout located below the level of the liquid, with a supply-valve for receiving the liquid from the discharge-spout, and an air duct or passage leading to the interior of the tank from the normal or desired level of the liquid in the supply-valve, thereby interposing a liquid seal when the desired level is reached, to stop the flow of liquid from the tank.

6. An air-tight supply tank or hopper, having a downwardly-discharging spout, and provided with an air duct or passage leading from the interior of the tank to substantially the level of the open end of the discharge-spout, a supply-valve therefor consisting of a pivotally-suspended scoop-shaped receptacle, adapted when swung beneath the discharge-spout and the air-duct to retain the liquid and form a water seal around the opening of the air-duct, thereby arresting the flow of liquid from the tank.

7. An air-tight supply tank or hopper having a downwardly-projecting discharge-spout, and provided with an air duct or passage leading from its interior, a supply-valve therefor consisting of an oscillating receptacle for receiving the liquid from the spout, with means for oscillating the valve and thereby changing the level of the liquid contained therein, whereby the flow of liquid from the supply-hopper is arrested when the liquid in the valve is allowed to rise high enough to interpose a liquid seal around the air-duct.

8. In combination with the supply-valve of a weighing-machine, an actuator therefor consisting of a rolling weight, and of an oscillating support for supporting and guiding the weight to and from substantially the center of oscillation of the support.

9. In combination with the supply-valve of a weighing-machine, an actuator therefor consisting of a rolling weight and of an oscillating support therefor operatively connected with the supply-valve and extending in a substantially radial relation to its center of oscillation, arranged and operating by its respective inclinations to retain the rolling weight with its center of gravity substantially coincident with the axis of oscillation during the open position of the valve, and to allow the weight to roll outwardly upon reaching the drip-supply position.

10. In a weighing-machine, having a pivotally-mounted supply-valve, an actuator for the closing movement of the valve, consisting of a rolling weight and of a support therefor mounted upon and oscillating with the supply-valve, and forming a supporting guide or runway for the weight, whereby the latter is enabled to roll from a position substantially coincident with the center of oscillation of the valve in a direction substantially radial thereto.

11. In a weighing-machine, having a pivotally-mounted supply-valve, an actuator for closing the valve, consisting of a rolling weight and of a support therefor mounted upon and oscillating with the supply-valve, and forming a supporting guide or runway for the weight, so as to guide the latter toward and from a position substantially coincident with the axis of oscillation of the supply-valve, the weight-support being so disposed with relation to the valve as to gravitate the weight to the center of oscillation while the valve is in its full-supply position, and away from that center at the drip-supply position of the valve.

12. In combination with the supply-valve of a weighing-machine, an actuator therefor consisting of a rolling weight, and of a pivotally-mounted support therefor having a portion extending rearwardly with relation to its pivotal center to support the weight in its valve-closing position, and having also an upwardly and forwardly extending portion, which operates in conjunction with the rolling weight to partially counterbalance the valve while the latter is in its open position, substantially as described.

13. In a weighing-machine in combination with the supply-valve and the scale-beam thereof, an actuator for the closing movement of the valve, consisting of a rolling weight, and of a pivotally-mounted support forming a guide and runway for the weight so as to guide the latter to and from a position substantially coincident with the axis of oscillation of the support, means operable with the returning movement of the scale-beam for inclining the weight-support to gravitate the weight to the axis of oscillation of the support, and a primary actuator operating in conjunction with the load, to incline the weight-support to gravitate the weight away from the said axis of oscillation.

14. In combination with the valve mechanism of a weighing-machine, an actuator therefor consisting of a solid rolling weight, an oscillating support for guiding the rolling weight to and from substantially its center of oscillation and a pivotally-mounted auxiliary actuator for engaging with the valve mechanism to change the inclination of the weight-support to a position which allows the rolling weight to roll from its inoperative to its operative position.

15. In combination with the supply-valve of a weighing-machine, movable to full-supply, drip-supply and closed positions, a primary actuator for closing the valve from its full to its drip supply position, consisting of pivotally-mounted weight disengaging with the valve upon reaching its drip-supply position, and an actuator for entirely closing the valve from its drip-supply position, consisting of a solid rolling weight, and an oscillating support for guiding the rolling weight to and from substantially its center of oscillation and movable by the primary actuator to its operative position when the latter has closed the valve to its drip supply position.

16. Means for retaining the supply-valve in its drip-supply position during the poising movement of the beam, consisting of a latch-lever having its shorter end in operative engagement between the supply-valve and a fixed stop, and having its longer end operatively engaging with the beam during the poising movement of the latter.

17. Means for locking the supply-valve in its drip-supply position, consisting of a drip-lever extending from the valve, a latch-lever pivotally mounted upon a fixed portion of the machine, with its short end engaging with the drip-lever, and having a longer end engaging with the beam during the poising movement of the latter.

18. Means for locking the supply-valve in its drip-supply position, consisting of a drip-lever, a latch-lever having arms of unequal length from its pivotal center, the shorter arm engaging between the drip-lever and a fixed portion of the machine, and a by-pass latch pivotally mounted upon the beam and engaging with the longer arm of the latch-lever.

19. In a weighing-machine, the combination of a supply-valve, a primary actuator for closing the valve from its full-supply to its drip-supply position, a friction-reducing latch-lever having its shorter end in engagement with the supply-valve to latch it in its drip-supply position, and having its longer end operable with the poise mechanism of the machine to be released thereby when the poising position is reached.

20. In a weighing-machine, in combination with the supply-valve, closing devices therefor, consisting of a primary actuator for closing the valve from its full-supply to its drip-supply position, a latch-lever in operative engagement between the supply-valve and the poising devices, to latch the supply-valve in its drip-supply position, and to release it upon the poising of the load, and an actuator for the closing movement of the valve consisting of a rolling weight, and of a pivotally-mounted support forming a guide and runway for the weight, operatively connected with the primary actuator, for gravitating the weight to its operative position when the primary actuator reaches its drip-supply position.

21. The combination of the supply-valve, the primary actuator 19, the scale-beam 8, the latch-lever 26, the valve-closing actuator 71 and its support 70.

JOHN CHRISTIANSEN.
FRANK E. THOMPSON.

Witnesses:
JENNIE NELLIS,
W. H. HONISS.